(12) United States Patent
Mitra et al.

(10) Patent No.: US 10,129,969 B2
(45) Date of Patent: Nov. 13, 2018

(54) ARC CUTTING SYSTEM, INCLUDING COOLANT TUBES AND OTHER CONSUMABLES, AND RELATED OPERATIONAL METHODS

(71) Applicant: Hypertherm, Inc., Hanover, NH (US)

(72) Inventors: Madhura S. Mitra, Lebanon, NH (US); Soumya Mitra, Lebanon, NH (US); Brian J. Currier, Newport, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/484,185

(22) Filed: Apr. 11, 2017

(65) Prior Publication Data

US 2017/0295636 A1 Oct. 12, 2017

Related U.S. Application Data

(60) Provisional application No. 62/320,935, filed on Apr. 11, 2016.

(51) Int. Cl.
*H05H 1/28* (2006.01)
*B23K 10/00* (2006.01)
(Continued)

(52) U.S. Cl.
CPC .............. *H05H 1/28* (2013.01); *B23K 10/00* (2013.01); *B23K 10/006* (2013.01);
(Continued)

(58) Field of Classification Search
None
See application file for complete search history.

(56) References Cited

U.S. PATENT DOCUMENTS 5,893,985 A 4/1999 Luo et al.
5,977,510 A 11/1999 Lindsay
(Continued)

FOREIGN PATENT DOCUMENTS

CA 2521009 C * 6/2015 .............. H05H 1/28
CN 103222343 A * 7/2013 .............. H05H 1/28
(Continued)

*Primary Examiner* — Douglas W Owens
*Assistant Examiner* — Srinivas Sathiraju
(74) *Attorney, Agent, or Firm* — Proskauer Rose LLP

(57) ABSTRACT

A method of using a coolant tube in a liquid cooled plasma arc torch is provided. The method includes installing the coolant tube and a first electrode in the plasma arc torch. The method also includes biasing, by a first coolant flow, a biasing surface of the coolant tube against the first electrode, such that the coolant tube translates axially along the longitudinal axis to contact the first electrode. The biasing by the first coolant flow defines a first distance in an axial direction between the O-ring of the coolant tube and a proximal end of the first electrode. The method further includes removing the first electrode from the plasma arc torch and installing a second electrode in the torch. The method includes biasing, by a second coolant flow, the biasing surface of the coolant tube against the second electrode, such that the coolant tube translates axially along the longitudinal axis to contact the second electrode. The biasing by the second coolant flow defines a second distance in an axial direction between the O-ring of the coolant tube and a proximal end of the second electrode. A difference between the first distance and the second distance is at least about 0.25 inches.

23 Claims, 3 Drawing Sheets

(51) Int. Cl.
*H05H 1/34* (2006.01)
*B23K 37/00* (2006.01)
*H05H 1/38* (2006.01)

(52) U.S. Cl.
CPC ............ *B23K 37/003* (2013.01); *H05H 1/34* (2013.01); *H05H 1/3405* (2013.01); *H05H 1/38* (2013.01); *H05H 2001/3436* (2013.01); *H05H 2001/3468* (2013.01)

(56) References Cited

U.S. PATENT DOCUMENTS

| | | | |
|---|---|---|---|
| 6,946,617 B2 | 9/2005 | Brandt et al. | |
| 8,766,134 B2 * | 7/2014 | Mather | B23K 9/013 219/121.39 |
| 8,779,323 B2 * | 7/2014 | Ashtekar | H05H 1/28 219/121.49 |
| 9,313,871 B2 * | 4/2016 | Namburu | H05H 1/28 |
| 2008/0116179 A1 | 5/2008 | Cook et al. | |
| 2008/0217305 A1 | 9/2008 | Sanders | |
| 2012/0055906 A1 | 3/2012 | Shipulski et al. | |
| 2015/0083695 A1 | 3/2015 | Laurisch et al. | |
| 2017/0042013 A1 | 2/2017 | Sanders et al. | |
| 2017/0042014 A1 * | 2/2017 | Sanders | G06K 19/07773 |
| 2017/0181261 A1 * | 6/2017 | Roberts | H05H 1/28 |

FOREIGN PATENT DOCUMENTS

| | | | |
|---|---|---|---|
| EP | 1933607 A1 | 6/2008 | |
| EP | 2271190 A3 * | 8/2011 | ............ H05H 1/28 |
| EP | 2640167 A1 | 9/2013 | |
| EP | 2082622 B2 * | 7/2015 | ............ H05H 1/28 |
| WO | WO 2004093502 A1 * | 10/2004 | ............ H05H 1/28 |
| WO | WO 2009070362 A1 * | 6/2009 | ............ H05H 1/28 |
| WO | WO 2012074591 A1 * | 6/2012 | ............ H05H 1/28 |

* cited by examiner

ARC CUTTING SYSTEM, INCLUDING COOLANT TUBES AND OTHER CONSUMABLES, AND RELATED OPERATIONAL METHODS

CROSS REFERENCE TO RELATED APPLICATION

This application claims the benefit of and priority to U.S. Provisional Patent Application No. 62/320,935, filed Apr. 11, 2016, which is owned by the assignee of the instant application and incorporated herein by reference in its entirety.

TECHNICAL FIELD

The present invention generally relates to the field of plasma arc cutting systems and processes. More specifically, the invention relates to improved consumable components (e.g., coolant tubes) and operational methods for cooling a plasma arc torch.

BACKGROUND

Plasma arc torches are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, and passages for cooling, passages for arc control fluids (e.g., plasma gas). A swirl ring can be used to control fluid flow patterns in the plasma chamber formed between the electrode and the nozzle. For liquid cooled plasma arc torches, a coolant tube can be installed in each torch to deliver a liquid coolant to various consumables in the torch tip to prevent overheating. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Existing liquid cooled plasma arc torches require the use of different coolant tubes to accommodate electrodes of different sizes for difference cutting processes. For example, an 80-amp cutting process may require installation of a longer electrode than a 300-amp cutting process, which necessitates the use of different coolant tubes to accommodate the electrodes of different lengths. Improvements are thus needed to simplify torch parts and reduce the number of consumable components installed and/or removed relative to a torch body when the cutting process is changed.

SUMMARY

It is therefore an objective of the present invention to provide a liquid coolant tube that is compatible with consumable components (e.g., electrodes) of different processes, thereby reducing the complexity of torch component installation and removal. In some embodiments, a universal coolant tube is provided that is usable with electrodes of different sizes, thus avoiding the need to purchase different coolants tubes for different cutting processes.

In one aspect, a method of using a coolant tube in a liquid cooled plasma arc torch is provided. The coolant tube comprises a substantially hollow, elongated coolant tube body including a proximal end, a distal end, and a longitudinal axis extending therethrough. The method includes installing the coolant tube in the plasma arc torch, where the coolant tube includes an O-ring at the proximal end, and installing a first electrode in the plasma arc torch such that the distal end of the coolant tube is located within an interior cavity of the first electrode. The method includes providing a first coolant flow to the plasma arc torch through the hollow coolant tube body, and biasing, by the first coolant flow, a biasing surface of the coolant tube against the first electrode, such that the coolant tube translates axially along the longitudinal axis to contact the first electrode. The biasing by the first coolant flow defines a first distance in an axial direction between the O-ring of the coolant tube and a proximal end of the first electrode. The method also includes removing the first electrode from the plasma arc torch, installing a second electrode in the plasma arc torch such that the distal end of the coolant tube is located within an interior cavity of the second electrode and providing a second coolant flow to the plasma arc torch through the hollow coolant tube body. The method further includes biasing, by the second coolant flow, the biasing surface of the coolant tube against the second electrode, such that the coolant tube translates axially along the longitudinal axis to contact the second electrode. The biasing by the second coolant flow defines a second distance in an axial direction between the O-ring of the coolant tube and a proximal end of the second electrode. A difference between the first distance and the second distance is at least about 0.25 inches.

In some embodiments, the first electrode has a first length along the longitudinal axis and the second electrode has a second length along the longitudinal axis, the first length being less than the second length. In some embodiments, the first distance is greater than the second distance by about 0.25 inches or greater. In some embodiments, the plasma arc torch with the first electrode is operated at a current of about 300 amperes. In some embodiments, the plasma arc torch with the second electrode is operated at a current of about 80 amperes.

In some embodiments, the first electrode has a first length along the longitudinal axis and the second electrode has a second length along the longitudinal axis, the first length being greater than the second length. In some embodiments, the first distance is less than the second distance by about 0.25 inches or greater.

In some embodiments, the difference between the first distance and the second distance is about 0.37 inches.

In some embodiments, the coolant tube further comprises a radial alignment surface at the proximal end of the coolant tube. A length of the radial alignment surface along the longitudinal axis can be at least 0.25 inches. For example, the length of the radial alignment surface along the longitudinal axis is about 0.4 inches. As another example, the length of the radial alignment surface along the longitudinal axis is about 0.5 inches. In some embodiments, the length of the radial alignment surface along the longitudinal axis is greater than the first distance or the second distance.

In some embodiments, the method further comprises contacting an interior surface of the cavity of the first or the second electrode by one or more alignment feet at the distal end of the coolant tube during the biasing. In some embodiments, each alignment foot of the coolant tube has a length along the longitudinal axis of about 0.03 inches.

In another aspect, a universal coolant tube for a liquid cooled plasma arc torch is provided. The coolant tube includes a substantially hollow, elongated coolant tube body including a proximal end, a distal end, and a longitudinal axis extending therethrough. The coolant tube body is configured to provide a coolant flow to an electrode of the plasma arc torch. The coolant tube includes a flared portion at the distal end of the coolant tube and a plurality of feet at the distal end of the flared portion. The plurality of feet are configured to physically contact an interior surface of the electrode. The coolant tube also includes an O-ring at the proximal end of the coolant tube and a radial extensive portion located between the proximal end of the coolant tube and the O-ring and configured to be axially biased toward the electrode. The radial extensive portion includes a radial alignment surface that is at least about 0.25 inches in length along the longitudinal axis.

In some embodiments, a length of the radial alignment surface along the longitudinal axis is at least 0.25 inches. For example, the length of the radial alignment surface along the longitudinal axis is about 0.4 inches. As another example, the length of the radial alignment surface along the longitudinal axis is about 0.5 inches.

In some embodiments, a length of each of the plurality of feet along the longitudinal axis is about 0.03 inches.

In some embodiments, the radial extensive portion of the coolant tube is configured to be biased by a varying axial distance depending on a length of the electrode. The axial distance is measured between the O-ring and a proximal end of the electrode. In some embodiments, the axial distance is larger for an electrode having a shorter length.

In some embodiments, the plasm arc torch with the universal coolant tube is operated at a current of about 80 amperes. In some embodiments, the plasm arc torch with the universal coolant tube is operated at a current of about 300 amperes.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
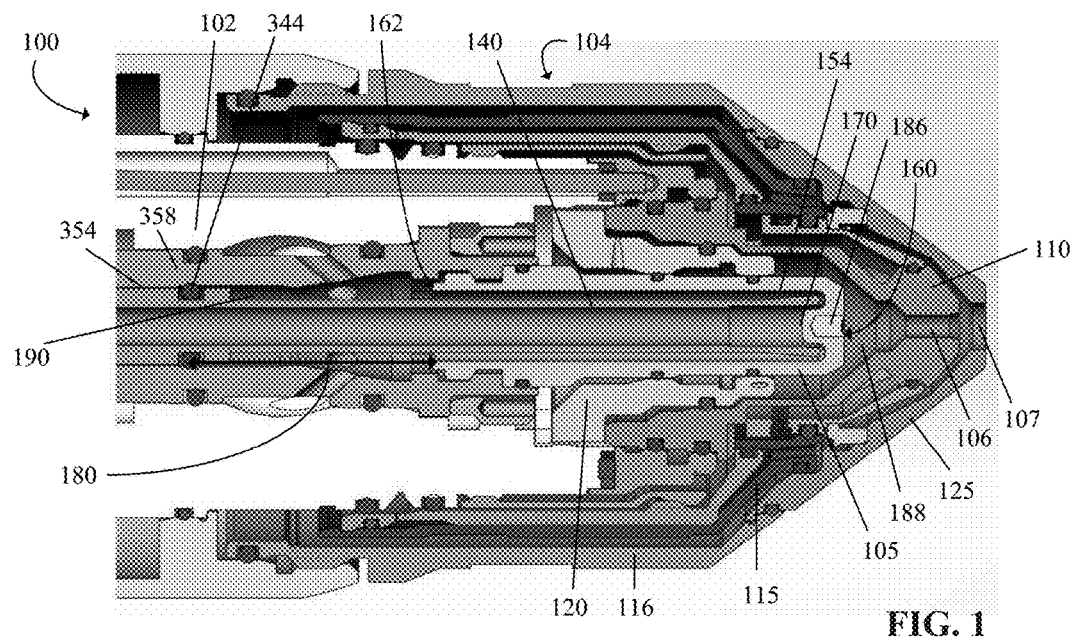
FIG. 1 is a cross-sectional view of a liquid-cooled plasma arc torch with a universal coolant tube, according to an illustrative embodiment of the present invention.

FIG. 1 is a cross-sectional view of a liquid-cooled plasma arc torch 100 with a universal coolant tube 140, according to an illustrative embodiment of the present invention. The plasma arc torch 100 includes a torch body 102 coupled to the coolant tube 140 and a torch tip 104 having multiple consumables comprising, for example, an electrode 105, a nozzle 110, an inner retaining cap 115, an outer retaining cap 116, a swirl ring 120, and a shield 125. As illustrated, the electrode 105 has an elongated body defining a proximal end 162 and a distal end 160. The elongated body of the electrode 105 has an emissive insert 186 disposed in the distal end 160 so that an emission surface is exposed. The insert 186 can be made of hafnium or other materials that possess suitable physical characteristics, including corrosion resistance and a high thermionic emissivity. A cavity 154 is disposed at the distal end 160 of the electrode 105 at its inner surface for receiving at least a distal portion of the coolant tube 140. In some embodiments, the cavity 154 includes a step or protrusion 170 for orienting and aligning the coolant tube 140 and allowing a liquid coolant from the coolant tube 140 to flow around the distal portion of the electrode 105 that is holding the emissive insert 186, thereby cooling of the insert 186.

The nozzle 110 is spaced from the electrode 105 and has a central nozzle exit orifice 106. A plenum 188 is defined between the nozzle 110 and the electrode 105. The swirl ring 120 is mounted around the electrode 105 and configured to impart a tangential velocity component to a plasma gas flow, thereby causing the plasma gas flow to swirl. The inner retaining cap 115 is securely connected (e.g., threaded) to the torch body 102 to retain the nozzle 110 to the torch body 102 and to radially and/or axially position the nozzle 110 with respect to a longitudinal axis of the torch 100. The shield 125, which includes a shield exit orifice 107, is connected to the outer retaining cap 116 that secures the shield 125 to the torch body 102. In some embodiments, the nozzle exit orifice 106 and optionally, the shield exit orifice 107, define a plasma arc exit orifice through which a plasma arc is delivered to a workpiece during torch operation. The torch 100 can additionally include electrical connections, passages for cooling, and passages for arc control fluids (e.g., plasma gas). In some embodiments, the liquid-cooled plasma arc torch 100 of FIG. 1 is operated at a current of about 80 amperes.

Figure 2:
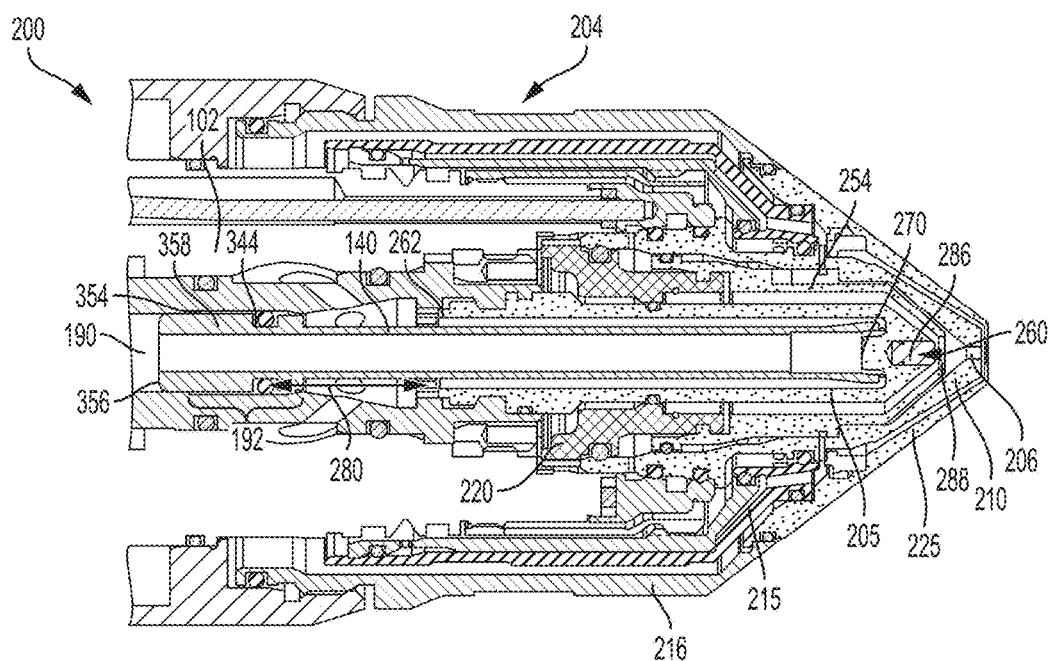
FIG. 2 is a cross-sectional view of another liquid-cooled plasma arc torch with the universal coolant tube of FIG. 1 installed therein, according to another illustrative embodiment of the present invention.

FIG. 2 is a cross-sectional view of another liquid-cooled plasma arc torch 200 with the universal coolant tube 140 of FIG. 1 installed therein, according to an illustrative embodiment of the present invention. In some embodiments, the same coolant tube 140 of FIG. 1 is used in the torch 200 of FIG. 2. In some embodiments, the same torch body 102 and coolant tube 140 of FIG. 1 are used in the torch 200 of FIG. 2, such that only components in the torch tip 204 may be changed.

The torch tip 204 has multiple consumables comprising, for example, an electrode 205, a nozzle 210, an inner retaining cap 215, an outer retaining cap 216, a swirl ring 220, and a shield 225. Similar to the electrode 105, the electrode 205 has an elongated body defining a proximal end 262 and a distal end 260. The electrode 205 has an emissive insert 286 disposed at its distal end 260. A cavity 254 is disposed at the distal end 260 of the electrode 205 at its inner surface, where the cavity 254 is configured to receive at least a distal portion of the coolant tube 140. In some embodiments, the cavity 254 includes a step or protrusion 270 for orienting and aligning the coolant tube 140 and cooling the emissive insert 286.

In some embodiments, the electrode 205 has a different length along the longitudinal direction than the length of the electrode 105 of FIG. 1 because the plasma arc torch 200 is used in a process requiring a different current output than the torch 100 of FIG. 1. For example, plasma arc torch 200 is operated at a current of about 80 amperes, and the plasma arc torch 100 is operated at a current of about 300 amperes, in which case the electrode 205 for the 80-amp process is adapted to be longer than the electrode 105 for the 300-amp process. This is because the torch tip 204 for an 80-amp process is adapted to have a smaller plenum 288 and a smaller/shorter nozzle exit orifice 206 due to the generation of an arc that is smaller in diameter and has a shorter arc stretch. Therefore, in order to use the same torch body 102 for both electrodes 105, 205, the lower-amped electrode 205 is longer so that the emissive insert 286 is located closer to the workpiece during torch operation. However, even though the electrodes 105, 205 have different lengths, the same coolant tube 140 and/or torch body 102 is compatible with both electrodes and are usable in both the torch 100 of FIG. 1 and the torch 200 of FIG. 2, In some embodiments, the electrode 105 for a 300-amp process is about 1.62 inches long and the electrode 205 for an 80-amp process is about 1.93 inches long, with a difference in length between the electrodes of about 0.31 inches. The protrusions 170, 270 of electrodes 105, 205 can have a substantial identical length along the longitudinal axis of about 0.09 inches. In some embodiments, the torches 100, 200 have substantially the same length in the longitudinal direction after assembly of the torch components.

Figure 3A:
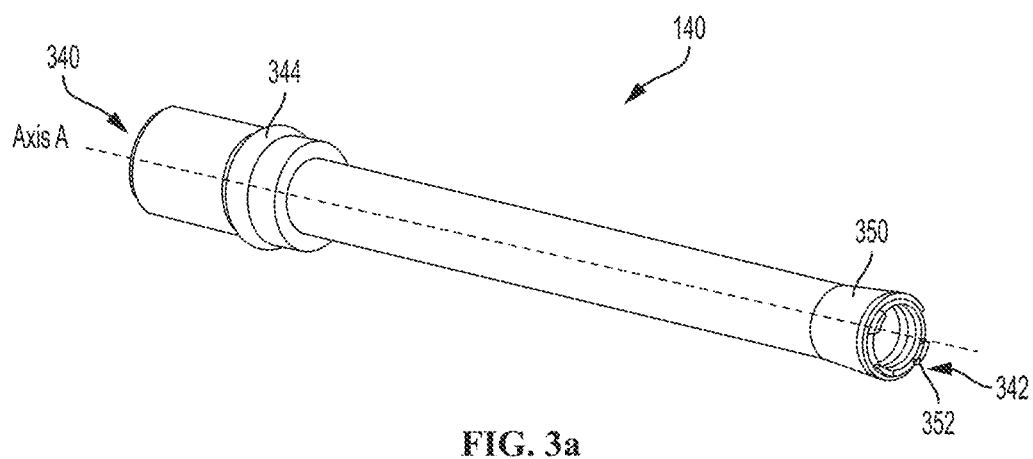
FIGS. 3a and 3b are isometric and sectional views, respectively, of the universal coolant tube of FIGS. 1 and 2, according to an illustrative embodiment of the present invention.
Figure 3B:
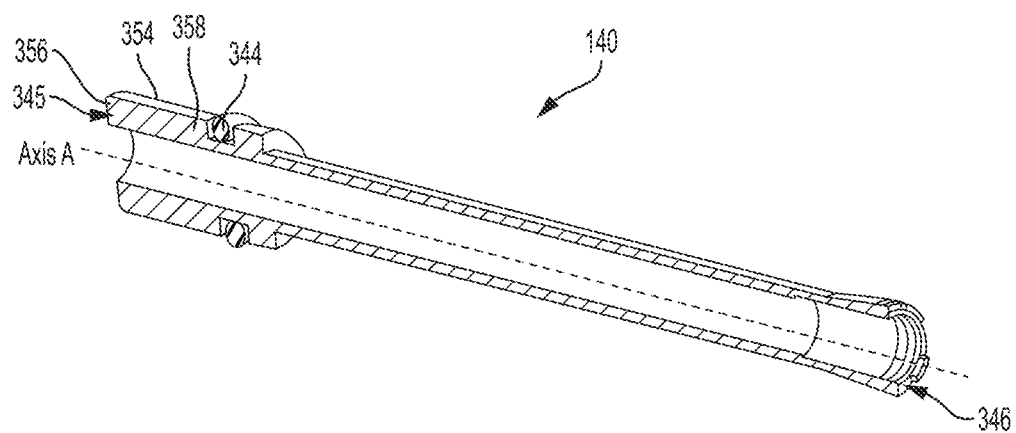

FIGS. 3a and 3b are isometric and sectional views, respectively, of the universal coolant tube 140 of FIGS. 1 and 2, according to an illustrative embodiment of the present invention. As illustrated, the coolant tube 140 has an elongated body with a proximal portion (generally referred to as the proximal end) 340, which is the end that is configured to engage with the torch body 102, and a distal portion (generally referred as the distal end) 342, which is the end that is configured to engage with the electrode 105 or 205. A longitudinal axis A extends along the body of the coolant tube 140 through the proximal end 340 and the distal end 342. The elongated body of the coolant tube 140 is adapted to be substantially hollow such that it provides a coolant flow for circulation between the torch body 102 and the electrode 105 or 205. For example, the coolant tube 140 has an opening 345 at its proximal end 340 and an opening 346 at its distal end 342 for allowing a coolant flow to enter and leave the coolant tube 140, respectively.

In some embodiments, the coolant tube 140 has a distal tip 350 disposed at the distal end 342. The distal tip 350 has a bell/flared shape, where a diameter of the distal tip 350 becomes large and/or more flared as it extends in the distal direction. In some embodiments, one or more alignment protrusions/feet 352 are located at the distal end of the distal tip 250, extending axially along the longitudinal axis A. The alignment feet 352 are configured to physically contact an interior surface of the electrode 105 within the cavity 154 of the electrode 105 (or an interior surface of the electrode 205 within the cavity 254 of the electrode 205) when the coolant tube 140 is biased against the electrode 105 (or the electrode 205). For example, the alignment feet 352 are adapted to contact the surface of the cavity 154 around the protrusion 170 in the cavity 154. In some embodiments, each alignment foot 352 is about 0.03 inches in length along the longitudinal axis A.

In some embodiments, the proximal end 340 of the elongated body of the coolant tube 140 includes an elastomeric element 344, such as an O-ring, circumferentially disposed about an external surface of the coolant tube 140 to seal the coolant tube 140 against the torch body 102, while permitting axial translation/movement of the coolant tube 140 relative to the torch body 102. The proximal end 340 of the elongated body of the coolant tube 140 also includes a radial extensive portion 358 disposed between the O-ring 344 and the proximal end 340. The radial extensive portion 358 has a diameter larger than a diameter of the coolant tube body at the distal end 342. As shown, the radial extensive portion 358 includes a radial alignment surface 354 located on an outer side surface of the coolant tube 140 between the O-ring 344 and the proximal end 340. The radial alignment surface 354 is configured to radially align (i.e., center) the coolant tube 140 within the torch body 102. The radial alignment surface 354 also provides a surface for allowing the coolant tube 154 to axially slide within the torch body 102 during biasing. The radial alignment surface 354 can be at least 0.25 inches in length along the longitudinal axis A, such as 0.4 inches or 0.5 inches in length. In some embodiments, the radial extensive portion 358 includes a hydraulic biasing surface 356 disposed on the end face of the proximal end 340. The hydraulic biasing surface 356 is adapted to receive a biasing flow of liquid coolant to bias the coolant tube 140 axially in the distal direction until the alignment feet 352 of the coolant tube 140 physically contacts a surface of the cavity 154 or 254.

In operation, the coolant tube 140, including the radial extensive portion 358, is adapted to be biased by a varying axial distance within a torch depending on the length of the electrode used in the torch. For example, as illustrated in FIGS. 1 and 2, the electrode 105 of FIG. 1 is shorter along the longitudinal axis A than the electrode 205 of FIG. 2. Upon connection of the electrode 105 or 205 to the torch body 102, the distal end 160 of the shorter electrode 105 is located more proximal within the torch 100 than the distal end 260 of the longer electrode 205 within the torch 200. In some embodiments, the proximal end 162 of the shorter electrode 105 and the proximal end 262 of the longer electrode 205 are located in about the same axial position within the torch body 102. Thus, the coolant tube 140 is biased less distally to contact the shorter electrode 105 than to contact the longer electrode 205. In both cases, biasing stops when the alignment feet 352 of the coolant tube 140 contacts a surface of the cavity 154 or 254 in the respective electrode 105 or 205.

After biasing, translation distance 180 represents the axial distance between the O-ring 344 of the coolant tube 140 and the proximal end 162 of the shorter electrode 105. Similarly, translation distance 280 represents the axial distance between the O-ring 344 and the proximal end 262 of the longer electrode 205. Translation distance 180 is adapted to be longer than translation distance 280 because the distal end 160 of the shorter electrode 105 is more proximal within the torch body 102 (thus biases the coolant tube 140 less distally) than the distal end 260 of the longer electrode 205 within the torch body 102. In general, the axial translation distance between the O-ring 344 of the coolant tube 140 and the proximal end of an electrode is longer if the electrode has a shorter length. In some embodiments, the difference between translation distance 180 and translation distance 280 is about 0.25 inches or greater, such as about 0.37 inches. In some embodiments, the radial alignment surface 354 on the radial extensive portion 358 of the coolant tube 140 is longer in length than translation distance 180 or 280.

In some embodiment, the torch body 102 includes a substantially cylindrical cavity 190 configured to house a least a proximal section of the coolant tube 140. An alignment section 192 of the cavity 190 at its distal end (illustrated in FIG. 2) generally has a larger diameter than that of the remaining section of the cavity 190. The alignment section 192 is configured to accommodate movement of the O-ring 344 of the coolant tube 140, such as allowing the O-ring 344 to translate back and forth depending on the length of the electrode coupled to the torch body 102. Specifically, the openings at both ends of the alignment section 192 has a smaller diameter than the diameter of the alignment section 192 to capture the O-ring 344 once the coolant tube 140 is inserted inside of the torch body.

Figure 4:
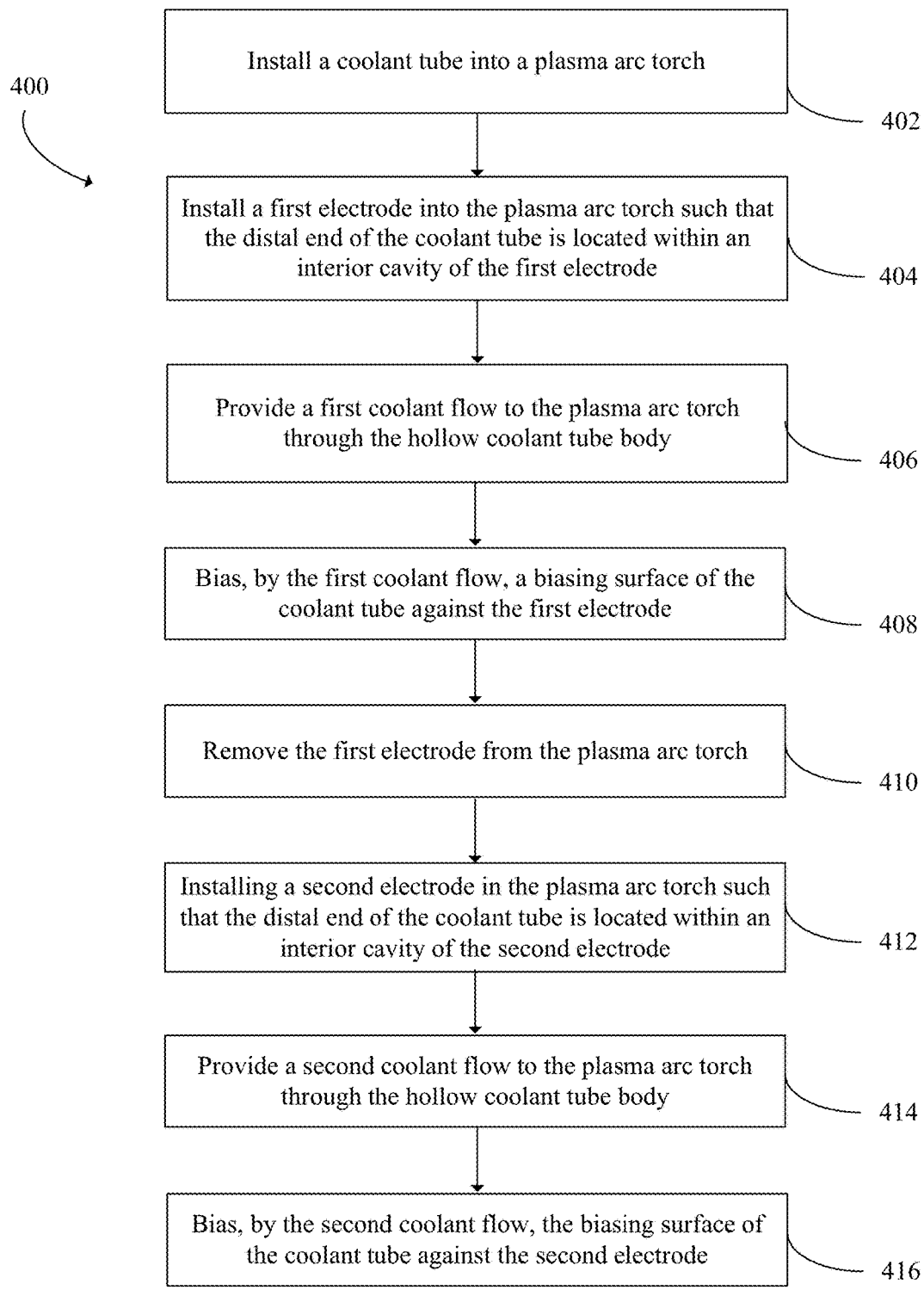
FIG. 4 is a diagram illustrating a process for using the universal coolant tube of FIGS. 1 and 2, according to an illustrative embodiment of the present invention.

FIG. 4 is a diagram illustrating a process for using the universal coolant tube 140 of FIGS. 1 and 2, according to an illustrative embodiment of the present invention. The process starts with installing the coolant tube 140 in a plasma arc torch, such as in the torch 100 of FIG. 1 (step 402). The coolant tube 140 is configured to be attached to the torch body 102. A first electrode, such as the electrode 105, is then installed into the torch 100 such that the distal end 342 of the coolant tube 140 is located within the interior cavity 154 of the first electrode 105 (step 404). A liquid coolant flow is provided from the torch body 102 to the first electrode 105 via the coolant tube 140 (step 406). The liquid coolant can be introduced from the proximal opening 345 of the coolant tube 140 and exit into the cavity 154 of the electrode 105 at the distal opening 346 of the coolant tube 140. This liquid coolant flow is adapted to bias the coolant tube 140 axially in the distal direction by pushing against the hydraulic biasing surface 356 until the alignment feet 352 at the distal end 342 of the coolant tube 140 contacts a surface of the cavity 154 of the electrode 105 (step 408). During biasing, the radial extensive portion 358 of the coolant tube 140 is translated toward the distal direction along the longitudinal axis A. After biasing, translation distance 180 represents the axial distance between the O-ring 344 of the coolant tube 140 and the proximal end 162 of the first electrode 105.

The assembled torch, which includes the coolant tube 140 and the electrode 105, is used to perform a first cutting operation at a specific current output. When a second cutting operation at a different current output is desired, an operator can remove the first electrode 105 from the torch body 102 (step 410) and install a second electrode, such as the electrode 205 of FIG. 2, that is compatible with the desired current output for the second operation (step 412). After installation, the distal end 342 of the coolant tube 140 is located within the interior cavity 254 of the second electrode 205. A liquid coolant flow is provided through the hollow body of the coolant tube 140 (step 414) to axially bias the coolant tube 140 against the second electrode 205 in the distal direction such that the alignment feet 352 of the coolant tube 140 comes into contact with a surface of the cavity 254 at the distal end 260 of the electrode 205 (step 416). During biasing, the coolant tube 140, including the radial extensive portion 358, is axially translated toward the distal direction along the longitudinal axis A. After biasing, translation distance 280 represents the axial distance between the O-ring 344 of the coolant tube 140 and the proximal end 262 of the second electrode 205. In some embodiments, due to the difference in the current requirement between the first and second cutting operations, the lengths of the electrodes 105, 205 are different. This electrode length difference in turn causes a difference in the axial translation distances 180, 280, which can be at least about 0.25 inches. However, the same universal coolant tube 140 is used in both cutting operations.

As an example, the first cutting operation is at about 300 amperes and the second cutting operation is at about 80 amperes, in which case the first electrode 105 is shorter than the second electrode 205 along the longitudinal axis A. The shorter first electrode 105 allows the coolant tube 140 to bias less axially in the distal direction in comparison to the longer second electrode 205. Thus, the translation distance 180, which corresponds to the first electrode 105 and the 300-amp operation, is adapted to be longer than the translation distance 280, which corresponds to the second electrode 205 and the 80-amp operation. In other embodiments, the first cutting operation involves using an electrode that is longer than the electrode used in the second cutting operation. Further, examples using the 80-amp and 300-amp torch configurations are illustrative only. The universal coolant tube 140 is generally compatible with electrodes of various lengths and cutting operations of various current requirements.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A method of using a coolant tube in a liquid cooled plasma arc torch, the coolant tube comprising a hollow, elongated coolant tube body including a proximal end, a distal end, and a longitudinal axis extending therethrough, the method comprising:
   installing the coolant tube in the plasma arc torch, the coolant tube includes an O-ring at the proximal end;
   installing a first electrode in the plasma arc torch such that the distal end of the coolant tube is located within an interior cavity of the first electrode;
   providing a first coolant flow to the plasma arc torch through the hollow coolant tube body;
   biasing, by the first coolant flow, a biasing surface of the coolant tube against the first electrode, such that the coolant tube translates axially along the longitudinal axis to contact the first electrode, the biasing by the first coolant flow defining a first distance in an axial direction between the O-ring of the coolant tube and a proximal end of the first electrode;
   removing the first electrode from the plasma arc torch;
   installing a second electrode in the plasma arc torch such that the distal end of the coolant tube is located within an interior cavity of the second electrode;
   providing a second coolant flow to the plasma arc torch through the hollow coolant tube body; and
   biasing, by the second coolant flow, the biasing surface of the coolant tube against the second electrode, such that the coolant tube translates axially along the longitudinal axis to contact the second electrode, the biasing by the second coolant flow defining a second distance in an axial direction between the O-ring of the coolant tube and a proximal end of the second electrode;
   wherein a difference between the first distance and the second distance is at least 0.25 inches.

2. The method of claim 1, wherein the first electrode has a first length along the longitudinal axis and the second electrode has a second length along the longitudinal axis, the first length being less than the second length.

3. The method of claim 2, wherein the first distance is greater than the second distance by 0.25 inches or greater.

4. The method of claim 1, wherein the first electrode has a first length along the longitudinal axis and the second electrode has a second length along the longitudinal axis, the first length being greater than the second length.

5. The method of claim 4, wherein the first distance is less than the second distance by 0.25 inches or greater.

6. The method of claim 1, wherein the difference between the first distance and the second distance includes 0.37 inches.

7. The method of claim 2, further comprising operating the plasma arc torch with the first electrode at a current that includes 300 amperes.

8. The method of claim 2, further comprising operating the plasma arc torch with the second electrode at a current that includes 80 amperes.

9. The method of claim 1, wherein the coolant tube further comprises a radial alignment surface at the proximal end of the coolant tube.

10. The method of claim 9, wherein a length of the radial alignment surface along the longitudinal axis is at least 0.25 inches.

11. The method of claim 10, wherein the length of the radial alignment surface along the longitudinal axis includes 0.4 inches.

12. The method of claim 10, wherein the length of the radial alignment surface along the longitudinal axis includes 0.5 inches.

13. The method of claim 9, wherein the length of the radial alignment surface along the longitudinal axis is greater than the first distance or the second distance.

14. The method of claim 1, further comprising contacting an interior surface of the cavity of the first or the second electrode by one or more alignment feet at the distal end of the coolant tube during the biasing.

15. The method of claim 14, wherein each alignment foot of the coolant tube has a length along the longitudinal axis that includes 0.03 inches.

16. A universal coolant tube for a liquid cooled plasma arc torch, the coolant tube comprising:
   a hollow, elongated coolant tube body including a proximal end, a distal end, and a longitudinal axis extending therethrough, the coolant tube body configured to provide a coolant flow to an electrode of the plasma arc torch;
   a flared portion at the distal end of the coolant tube;
   a plurality of feet at the distal end of the flared portion, the plurality of feet configured to physically contact an interior surface of the electrode;
   an O-ring at the proximal end of the coolant tube; and
   a radial extensive portion located between the proximal end of the coolant tube and the O-ring and configured to be axially biased toward the electrode, wherein the radial extensive portion includes a radial alignment surface that is at least 0.25 inches in length along the longitudinal axis.

17. The universal coolant tube of claim 16, wherein the length of the radial alignment surface includes 0.4 inches.

18. The universal coolant tube of claim 16, wherein the length of the radial alignment surface includes 0.5 inches.

19. The universal coolant tube of claim 16, wherein a length of each of the plurality of feet along the longitudinal axis includes 0.03 inches.

20. The universal coolant tube of claim 16, wherein the radial extensive portion of the coolant tube is configured to be biased by a varying axial distance depending on a length of the electrode, wherein the axial distance is measured between the O-ring and a proximal end of the electrode.

21. The universal coolant tube of claim 20, wherein the axial distance is larger for an electrode having a shorter length.

22. The universal coolant tube of claim 16, wherein the plasm arc torch with the universal coolant tube is operated at a current that includes 80 amperes.

23. The universal coolant tube of claim 16, wherein the plasm arc torch with the universal coolant tube is operated at a current that includes 300 amperes.

* * * * *